United States Patent
Hill

Patent Number: 6,144,382
Date of Patent: Nov. 7, 2000

[54] THREE-DIMENSIONAL ARROW FOR COMPUTER GRAPHICS

[75] Inventor: Kenneth Jamieson Hill, Plymouth Township, Mich.

[73] Assignee: Autodesk, Inc., San Rafael, Calif.

[21] Appl. No.: 09/163,520

[22] Filed: Sep. 30, 1998

[51] Int. Cl.[7] .................................................. G06F 3/33
[52] U.S. Cl. ..................... 345/355; 345/433; 345/419; 345/427; 345/135
[58] Field of Search .................... 345/145, 139, 345/433, 437, 135, 355, 419, 427, 976, 438, 439

[56] References Cited

U.S. PATENT DOCUMENTS

| | | | |
|---|---|---|---|
| 5,870,099 | 2/1999 | Horii | 345/427 |
| 5,999,165 | 12/1999 | Matsumoto | 345/355 |
| 6,014,142 | 1/2000 | Lahood | 345/355 |
| 6,016,145 | 1/2000 | Horvitz | 345/342 |
| 6,016,147 | 1/2000 | Gantt | 345/420 |

OTHER PUBLICATIONS computer generated solid arrow display of 3–D vector fields, Baden Fuller, A.J., pp. May 1–May 4, 1988.
computer screen cursor trajectories as controlled by an accupoint, Phillips, J.G. et al., pp. 314–319, Dec. 1998.
a two–dimensional large scale laser digitizer with a cordless cursor, Ikumatsu Fujimoto, pp. 416–418, 1988.

*Primary Examiner*—Mark R. Powell
*Assistant Examiner*—Wesner Sajous
*Attorney, Agent, or Firm*—Gates & Cooper

[57] ABSTRACT

A method, apparatus and article of manufacture for generating and rendering arrowheads that approximate the direction of the arrowhead. A base and an axis vector for the arrowhead are created, and a view direction vector, approximating the direction that a user of a computer is viewing the arrowhead, is determined. The angle between the axis vector and the view direction vector is calculated, and the arrowhead is displayed rotated by the angle between the view direction vector and the axis vector. Silhouette lines and portions of the base are selectively displayed depending on the angle that the arrowhead is viewed from.

12 Claims, 9 Drawing Sheets

THREE-DIMENSIONAL ARROW FOR COMPUTER GRAPHICS

BACKGROUND OF THE INVENTION

1. Field of the Invention

This invention relates in general to vector graphics systems, and more particularly, to a method, apparatus, and article of manufacture for generating renderings of three-dimensional arrows.

2. Description of Related Art

Arrows are used in 3D Computer Aided Design (CAD) systems and vector graphics systems to indicate connection points for objects, directionality of flow, connection methods for devices, and other uses.

Typically, two-dimensional representations of arrows are ambiguous. For example, an arrow that points thirty degrees out of the screen looks identical to an arrow that points thirty degrees into the screen. Because of this ambiguity, users must determine for themselves whether the arrow is pointing into or out of the screen, as well as how sharply the arrow is pointing into or out of the screen. Further, the display of the typical arrow is not aesthetically pleasing to the user. This ambiguity leaves the user unsure as to the correctness of the drawing, and therefore, unsure as to the correctness of the drawn part.

Therefore, there is a need in the art for a way to generate an arrow that indicates to the user a more specific direction. There is also a need in the art for an arrow that will indicate whether the arrow is pointing into or out of the screen. There is also a need in the art for an arrow that indicates how sharply the arrow is pointing into or out of the screen. There is also a need in the art to be able to quickly generate an arrow that indicates specific directions.

SUMMARY OF THE INVENTION

To overcome the limitations in the prior art described above, and to overcome other limitations that will become apparent upon reading and understanding the present specification, the present invention discloses a method, apparatus and article of manufacture for generating arrows that indicate a direction into or out of the screen. The method comprises the steps of creating a base, typically a circle, and an axis vector for the arrowhead, where the axis vector points from the center of the base to the apex of the arrowhead. A view direction vector is given, where the view direction vector is substantially normal to the frame of reference of the display of the computer. The angle between the view direction vector and the cone axis vector is determined. Two points on the base are connected by lines, called silhouette lines, to the axis vector at the apex of the arrowhead, and the arrow is displayed rotated by the angle between the view direction vector and the axis vector.

The general object of the present invention is to come up with a useful method for generating arrows on vector graphics or 3D CAD drawings. The specific object of the invention is to provide a method for generating arrows on 3D CAD drawings that indicate a direction for the arrow.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention describes a method, apparatus, and article of manufacture for rendering or generating arrows that indicate to a user the general and/or the specific direction that the arrow is pointing. To do this, a base of the arrow is generated, and a vector is generated that passes through the base in the direction that the arrow is pointing. Depending on the view angle, the arrow is completed by drawing lines from the base to the vector, intersecting the vector at the apex of the arrow. The base of the arrow is drawn such that the direction is indicated by the shape of the base and the resultant rotation of the lines and vector of the arrow.

Hardware Environment

Figure 1:
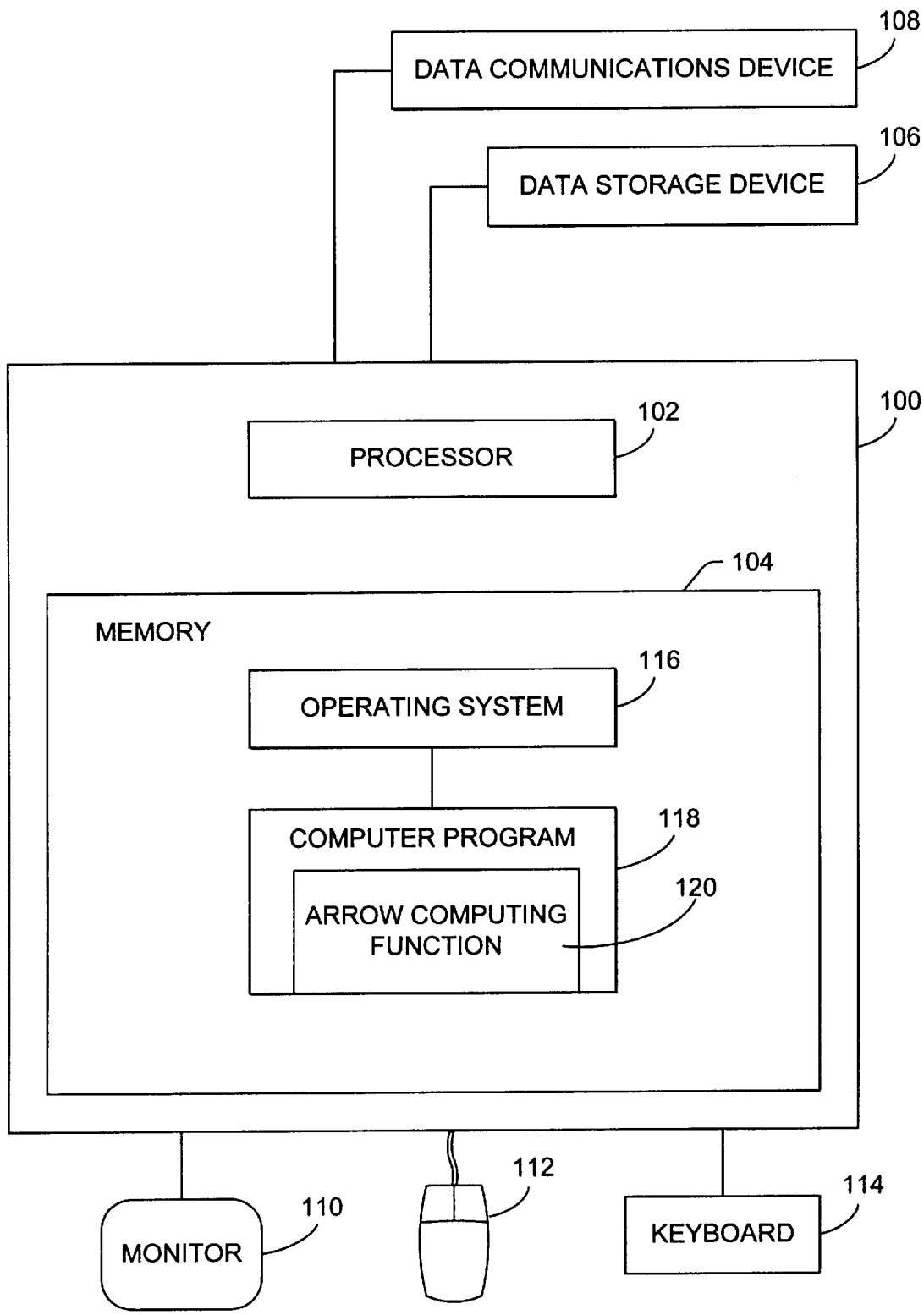
FIG. 1 illustrates an exemplary computer hardware environment that could be used with the present invention.

FIG. 1 is an exemplary hardware environment used to implement the preferred embodiment of the invention. The present invention is typically implemented using a personal computer 100, which generally includes, inter alia, a processor 102, random access memory (RAM) 104, data storage devices 106 (e.g., hard, floppy, and/or CD-ROM disk drives, etc.), data communications devices 108 (e.g., modems, network interfaces, etc.), monitor 110 (e.g., CRT, LCD display, holographic display device, etc.), mouse pointing device 112 and keyboard 114. It is envisioned that attached to the personal computer 100 may be other devices such as read only memory (ROM), a video card, bus interface, printers, etc. Any combination of the above components, or any number of different components, peripherals, and other devices, may be used with the computer 100 without departing from the scope of the present invention. For purposes of clarity and completeness, references herein to monitor 110 encompass and include additional references to holographic display devices, goggles, and helmets as well as video monitors.

The personal computer 100 usually operates under the control of an operating system 116. The present invention is usually implemented in one or more computer programs 118 that operate under the control of the operating system 116. The computer program 118 is usually a CAD program or other graphics program. In the preferred embodiment, the computer program 118 includes an arrow computing function 120.

Generally, the computer program 118 and arrow computing function 120 comprise instructions and/or data that are embodied in or retrievable from a computer-readable device, medium, or carrier, e.g., the data storage device 106, a remote device coupled to the computer 100 via the data communications device 108, etc. Moreover, these instructions and/or data, when read, executed, and/or interpreted by the computer 100 cause the computer 100 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Many modifications may be made to this configuration without departing from the scope of the present invention.

The present invention also teaches that any combination of the above components, or any number of different components, including computer programs, peripherals, and other devices, may be used to implement the present invention, so long as similar functions are performed thereby. The presentation of the computer system as described in FIG. 1 is not meant to limit the scope of the present invention, but to illustrate one possible embodiment of the present invention.

Computing Arrow Representation

Figure 2:
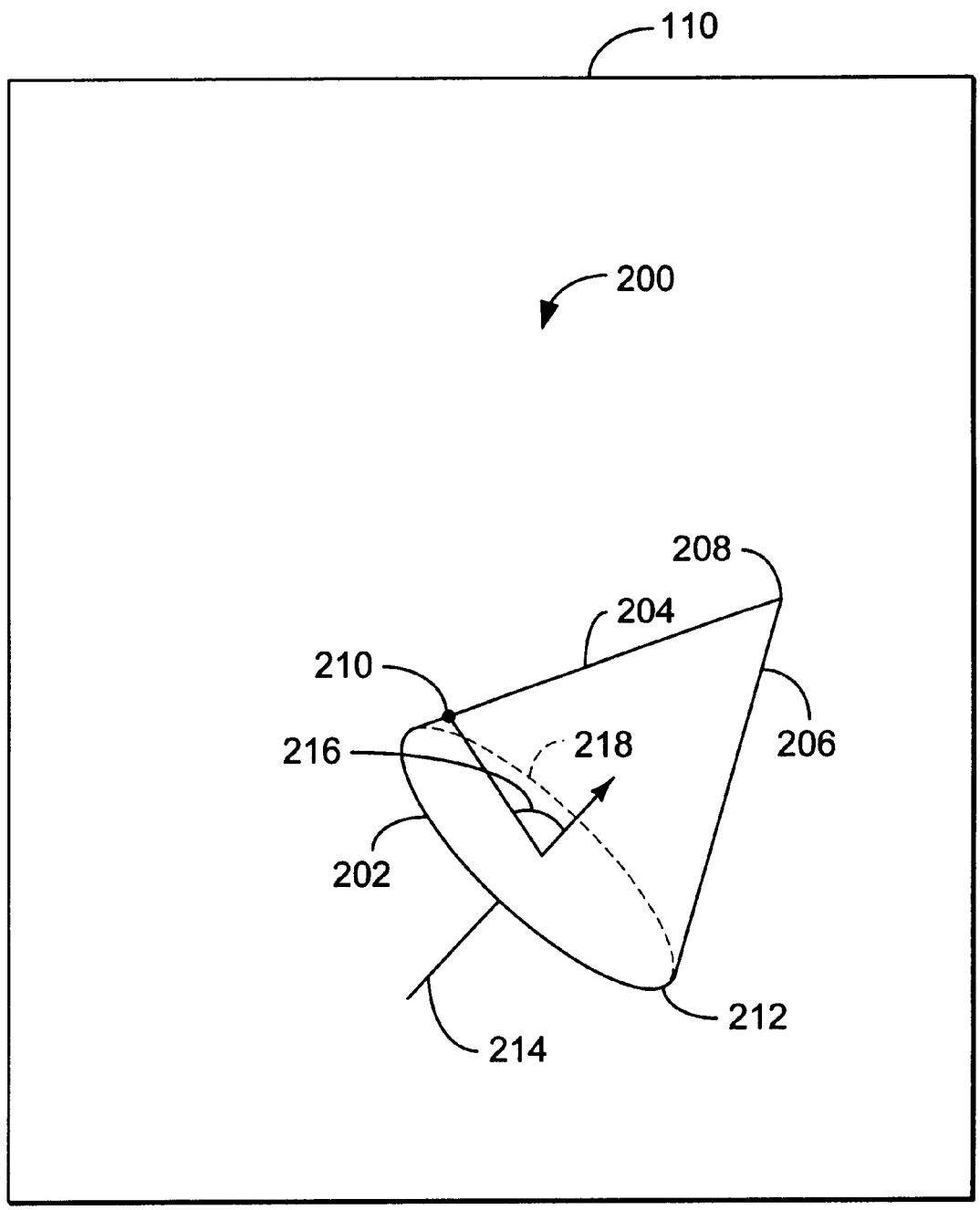
FIGS. 2–4 illustrate the components of arrows rendered according to the present invention.
Figure 3:
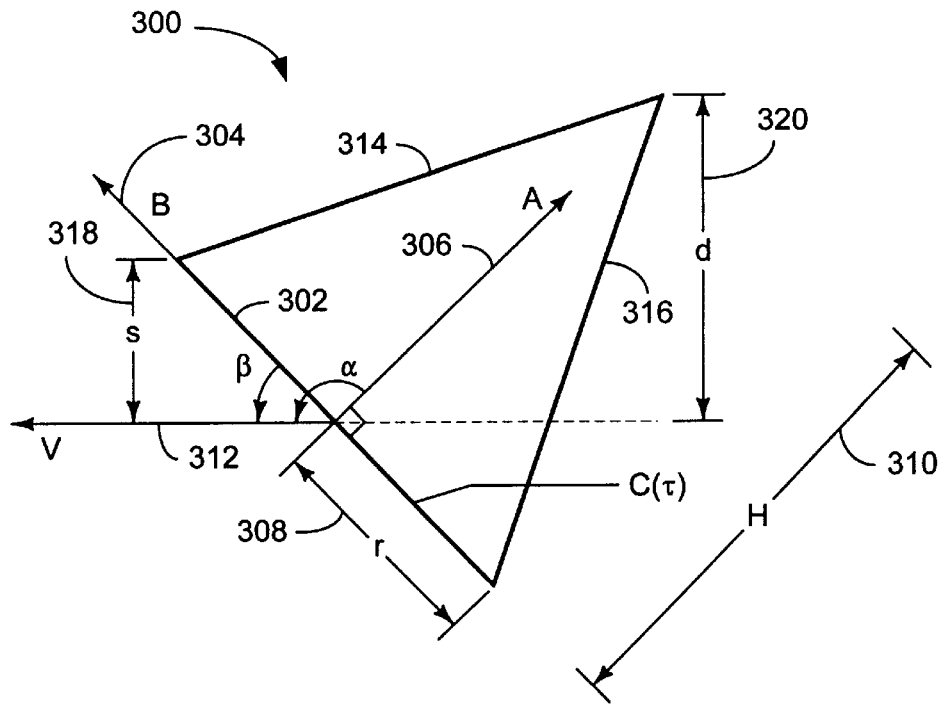
Figure 4:
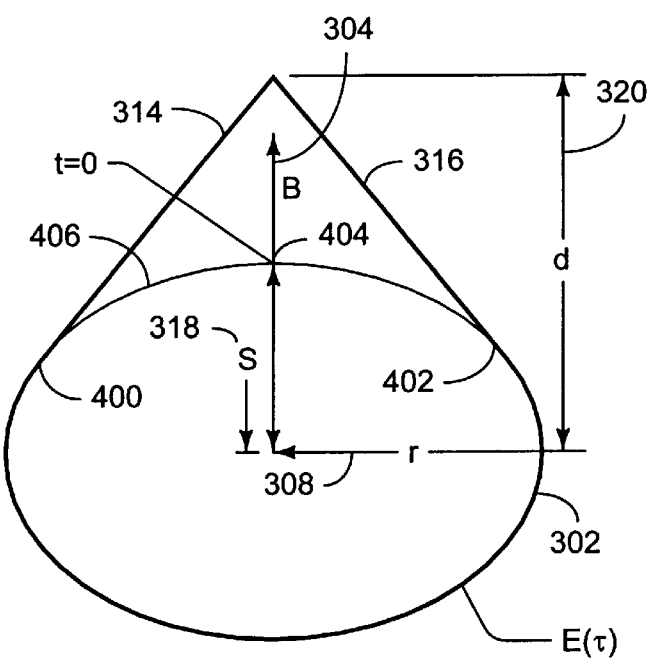

FIGS. 2–4 illustrate the components of arrows rendered according to the present invention.

FIG. 2 illustrates an embodiment of an arrow rendered by the present invention. Arrow 200 of the present invention comprises several parts. Arrow 200 has base 202, which can be partially obscured by the remainder of arrow 200 depending on the angle that arrow 200 is pointing. FIG. 2 is an illustration where a portion of base 202 is not illustrated on monitor 110. Arrow 200 also consists of silhouette lines 204 and 206, that connect the base 202 to an apex 208 of the arrow 200. Silhouette line 204 is connected to base 202 at intersection point 210, and silhouette line 206 is connected to base 202 at intersection point 212. Silhouette lines 204 and 206 are shown in FIG. 2, but depending on the direction of arrow 200, may not be displayed on monitor 110. Finally, arrow 200 may include leader line 214 to further indicate the direction that arrow 200 is pointing.

Intersection points 210 and 212 are determined via angle τ (tau) 216. Angle tau is discussed further with respect to FIGS. 4 and 6. As shown in FIG. 2, tau is not only an angle, but is a parameter of the base 202, which is a three-dimensional circle.

FIG. 3 illustrates a side view of an arrowhead rendered by the present invention. Initially, arrowhead 300 is drawn using a base 302 and a vector 306. Vector 306 is defined to have unit length. Base 302 is typically a circle, called the cone base circle, but can be other geometrical constructs if desired. Since FIG. 3 is a side view, base 302 is a line, because the view is an edge view of base 302. A base direction vector 304 for base 302, denoted as B, is in the same plane as base 302. Base direction vector 304 is the basis for angular measurements, and is calculated by:

$$B = (A \times V) \times A$$

Vector 306, called the cone axis vector, intersects the plane of base 302 at the center of the base 302, in a substantially normal perpendicular) direction. Vector 306 is denoted as vector A.

Base 302 has a radius 308, denoted as r. The height 310 of the arrowhead 300 is denoted as h. Height 310 can be defined as a unit height (h=1) because the value of height 310 will not affect the shape of arrowhead 300. Scaling of the geometry of arrowhead 300 can be handled at a time prior to display of arrowhead 300. Therefore, for purposes of illustration herein, height 310 is considered to be h=1. Thus, r is also the ratio of the radius of the arrowhead 300 to the height of the arrowhead 300.

View direction vector 312 defines the direction that a user of a computer would be viewing the arrowhead 300. View direction vector 312 is denoted as V, and has unit length, and points in a direction that a viewer of the arrowhead 300 would be looking. FIG. 3 illustrates the angle alpha (α) between cone axis vector A 306 and view direction vector V 312 to be an obtuse angle.

Derivation of Silhouette Lines

To determine the angular dependencies between vectors A, B, and V, the arrow computing function 120 performs certain calculations. The direction of vectors A and V are known. The angle between vector A and vector B is π/2 radians (all angles described herein are listed in radians). Thus, the angle β between vector B and vector V is given by $$\beta = \alpha - \frac{\pi}{2}$$

The arrow computing function 120 must also determine whether or not to display the silhouette lines 314 and 316 on the monitor 110. To determine this, lengths s 318 and d 320 must be determined.

To determine length s 318, and the direction of length s 318, the dot product of vector V and vector A, multiplied by the negative of the radius r, will yield $$s = r \sin \beta$$
$$= r \sin (\alpha \cdot \pi/2)$$
$$= -r \cos \alpha$$
$$s = -rV \cdot A$$

To determine length d 320:

$$d = |\sin \alpha| = \|V \times A\|$$

wherein standard right-hand rules for vector arithmetic are used to determine cross products.

To determine whether to display silhouette lines using the arrow computing function 120, the value of d 320 is compared to the absolute value of s 318.

If d≦|s|, then no silhouette lines are visible, because, as shown in FIG. 3, the edge of base 302 rises higher than the apex point of arrowhead 300. Other frames of reference can be understood by analogy to the frame of reference shown in FIG. 3, e.g., as long as d≦|s|, then no silhouette lines would be visible. The view is looking directly at the base 302 of arrowhead 300 or directly at the apex of the arrowhead 300, and thus, lines 314 and 316 would not be visible from that angle. If d is greater than s, then some portion of the conical section of arrowhead 300 is obscured, and the boundary of the obscured portion appears as lines 314 and 316.

FIG. 4 illustrates the projection of the arrowhead 300 cone onto the view plane for purposes of deriving the equations needed to complete the arrowhead.

Base 302, which as described above is typically a cone base circle, will be rotated with respect to angle β (the angle between the view plane and the cone axis vector A 306). In the illustration of FIG. 4, the calculated circle is shown as an ellipse, however, if arrowhead 300 is pointing directly into or out of the plane, the calculated circle of base 302 will appear as a circle or as a line if the axis vector 306 lies in the plane of the view, as shown in FIG. 3.

To determine the display of arrowhead 300, the angles α and β are determined in three dimensions. Two portions of arrowhead 300 will be selectively displayed depending on the angular relationships: silhouette lines 314 and 316, and a portion of base 302.

If the arrow is pointing sharply into or sharply out of the screen (monitor 110), the view direction vector 312 is intersecting the base at an angle such that distance s 318 is greater than or equal to distance d 320. If this is the case, silhouette lines 314 and 316 are not displayed, because the user is either looking directly at the base 302 of arrowhead 300 (arrowhead 300 is pointing substantially into monitor 110) or directly at the apex of the arrowhead 300, (arrowhead 300 is pointing substantially out of the monitor 110) and thus, lines 314 and 316 would not be visible from that angle. If d is greater than s, then some portion of the conical section of arrowhead 300 is obscured, and the boundary of the obscured portion appears as lines 314 and 316.

If the value of length s 318 is less than length d 320, silhouette lines 314 and 316 are displayed on the monitor 110. To attach silhouette lines 314 and 316 correctly to base 302, attachment points 400 and 402 must be determined. First, cone base vector B 304 is used to determine starting point 404. The starting point 404 is where cone base vector B 304 intersects base 302.

To connect silhouette lines 314 and 316, connection points 400 and 402 are determined by determining parameter τ (tau) which corresponds to an angle τ determined as described below in FIG. 6:

$$\tau = \arccos \frac{s}{d}$$

As shown in FIG. 4, τ is a parameter of the ellipse, and is related to the tau of FIG. 2 via the transformation of the three-dimensional circle to a two-dimensional ellipse. However, the numerical value of the parameter τ is equivalent to the value of angle τ. The intersection of silhouette lines 314 and 316 will intersect the base 302 at angle τ and angle 2π-τ as measured from vector B 304, which passes through point 404. However, the actual determination of τ is typically done by a polynomial approximation of the arccos function. Other methods for the determination of τ, and the connection points 400 and 402, can be performed without departing from the scope of the present invention.

Computation of Portion of Base 302 Between Silhouette Lines

If the silhouette lines 314 and 316 are to be displayed, a portion 406 of base 302 may be displayed if the arrow is pointing away from the user, e.g., the user is looking at the base 302 and the conical surface of the arrowhead 300, and can thus see the entire base of the arrowhead 300. However, if the arrow is pointing at the user, the user is looking at the outside of the arrowhead 300, and can only see a portion of the base 302, because the portion 406 of base 302 is obscured by the remainder of the cone that comprises arrowhead 300. To determine whether the portion 406 (which included where B intersects base 302 at point 404) of base 302 is displayed, the angle between the cone axis vector 306 and view direction vector 312 is checked. If the angle between the cone axis vector 306 and view direction vector 312 is acute, then portion 406 is not displayed on monitor 110. If the angle between the cone axis vector 306 and view direction vector 312 is obtuse, the portion 406 is displayed on monitor 110.

FIGS. 5A–5D illustrate arrows generated by the present invention.

Figure 5A:
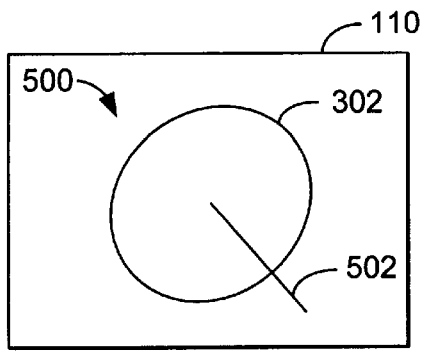
FIGS. 5A–5D illustrate arrows generated by the present invention.

FIG. 5A illustrates a view on monitor 110 where arrow 500 is pointing sharply into the monitor 110, away from the user's view. This situation occurs when the angle between the view direction vector 312 and cone axis vector 306 is acute and length s 318 is greater than or equal to length d 320. The user is looking in a direction substantially parallel to the direction of arrow 500, and can only see the base of arrowhead 300 and the absolute value of the direction of cone axis vector 306 pointing away from the user.

FIG. 5A also illustrates leader line 502 that is a part of arrow 500. Leader line 502 can be an approximate extension of cone axis vector 306. Further, leader line 502 can be of any shape, such as an arc, or a three-dimensional entity such as a thin cylinder, and can be added to arrowhead 300 to create arrow 500, or may be excluded completely. In a preferred embodiment, leader line 502 is substantially parallel to cone axis vector 306. Leader line 502 does not necessarily have to be attached to base 302, but can be attached anywhere on arrowhead 300.

The length l of leader line 502 that is hidden by arrow computing function 120 determined by:
which can also be computed by:

$$\frac{|s|}{l} = \sin(\pi - \alpha) = \sin\alpha = d$$

$$l = \frac{|s|}{d}$$

for h=1.

Figure 5B:
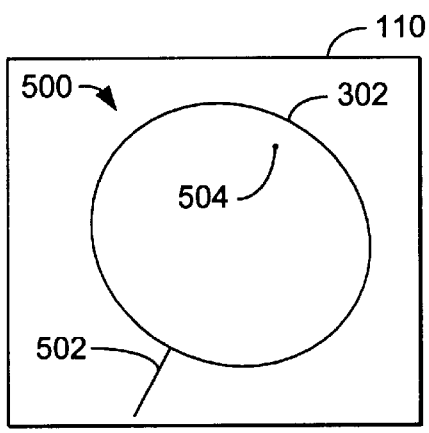

FIG. 5B illustrates a view on monitor 110 where arrow 500 is pointing sharply out of the monitor 110, substantially at the user. This situation occurs when the angle between the view direction vector 312 and cone axis vector 306 is obtuse and length s 318 is greater than or equal to length d 320. The user is still looking in a direction substantially parallel to the direction of arrow 500, but can now only see the base of arrow 500 and apex point 504 of arrow 500, and the direction of cone axis direction vector 306 is pointing at the user. FIG. 5B also illustrates apex 504, which shows the extension of leader line 502 at height h 320.

Figure 5C:
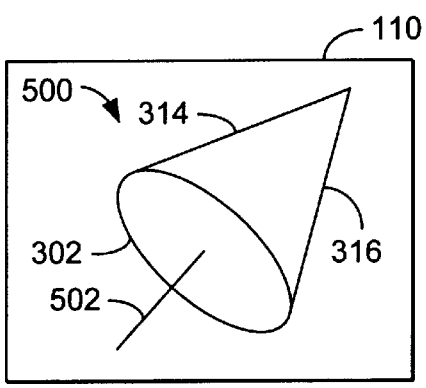

FIG. 5C illustrates a view on monitor 110 where arrow 500 is pointing into monitor 110. The entire base 302 is visible, and thus, the base 302 circle is drawn. Silhouette lines 314 and 316 are drawn, and leader line 502 indicates the direction of arrow 500.

Figure 5D:
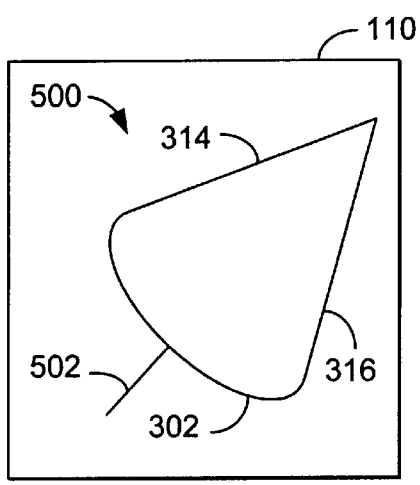

FIG. 5D illustrates a view on monitor 110 where arrow 500 is pointing out of monitor 110. A portion of the base 302 is obscured by the conical section of arrowhead 300 (because the angle between the view direction vector 312 and the cone axis vector 306 is obtuse). Thus, the section 406 between intersection points 400 and 402 is not illustrated on monitor 110.

Figure 6:
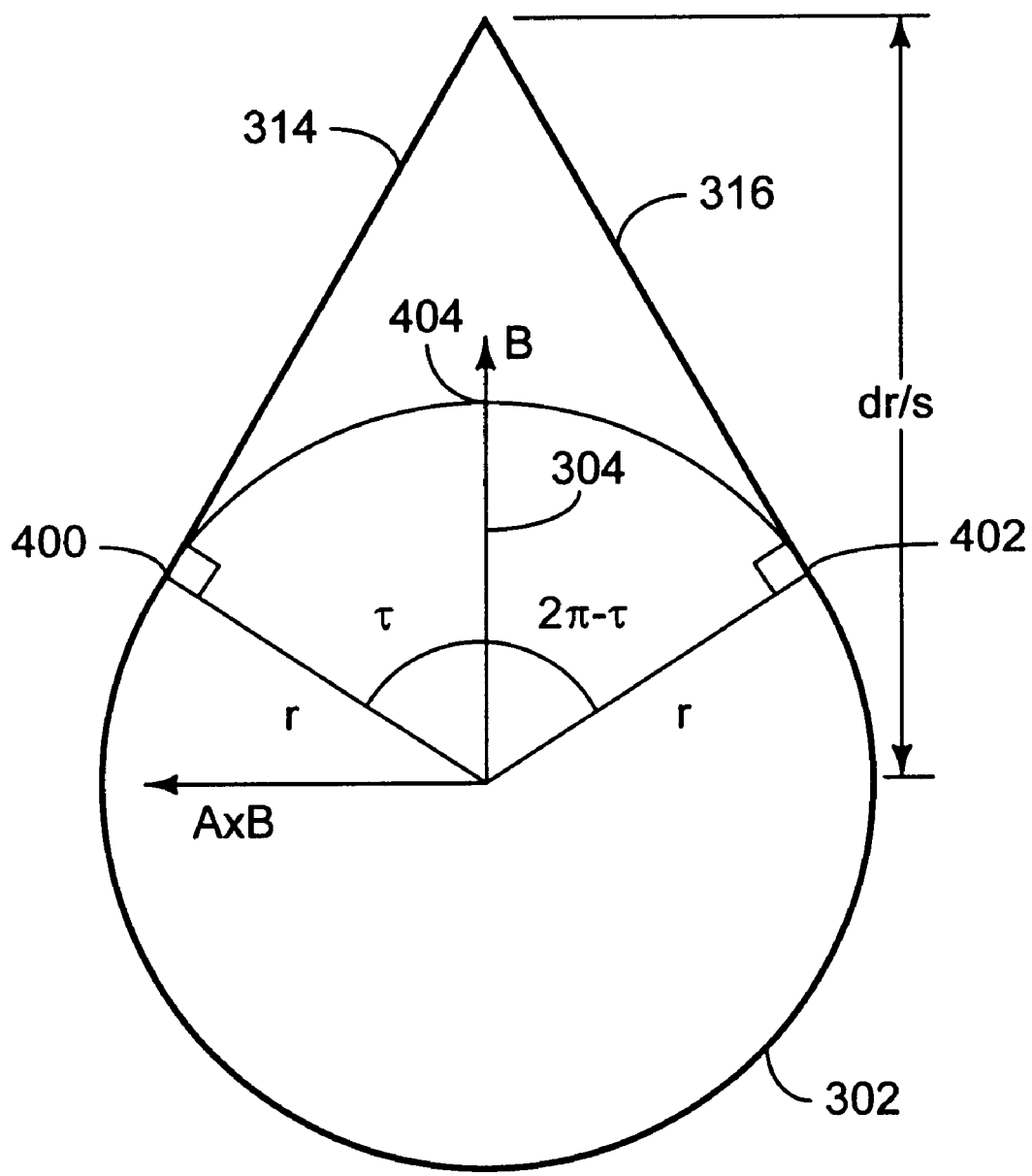
FIG. 6 illustrates the base being stretched into a circle for the arrowhead of the present invention.

FIG. 6 illustrates the base being stretched into a circle for the arrowhead of the present invention.

As shown in FIG. 6, base 302 has been stretched into a circle from the elliptical shape of FIG. 4. The stretching function is illustrated to show how τ (tau) is determined for the arrowhead 300.

As base 302 is stretched to a circle, length d 320 must also stretch in the ratio of r/s to become length dr/s. Vector B 304 intersects base 302 at point 404. Since silhouette lines 314 and 316 now intersect points 400 and 402 at right angles, angle τ is given by:

$$\cos \tau = r/(dr/s)$$

$$\cos \tau = s/d$$

$$\tau = \arccos s/d$$

This transformation yields the same answer for the base 302 of FIG. 4. τ is again both a parameter of the base 302 and an angle of the two dimensional circle, and is related to the τ of FIGS. 2 and 4.

The computations have been performed with h=1 for simplicity, allowing the program to scale the geometry before use. Alternatively, the computation can be rewritten assuming h is not 1 to arrive at a similar result.

Object Model

Figure 7:
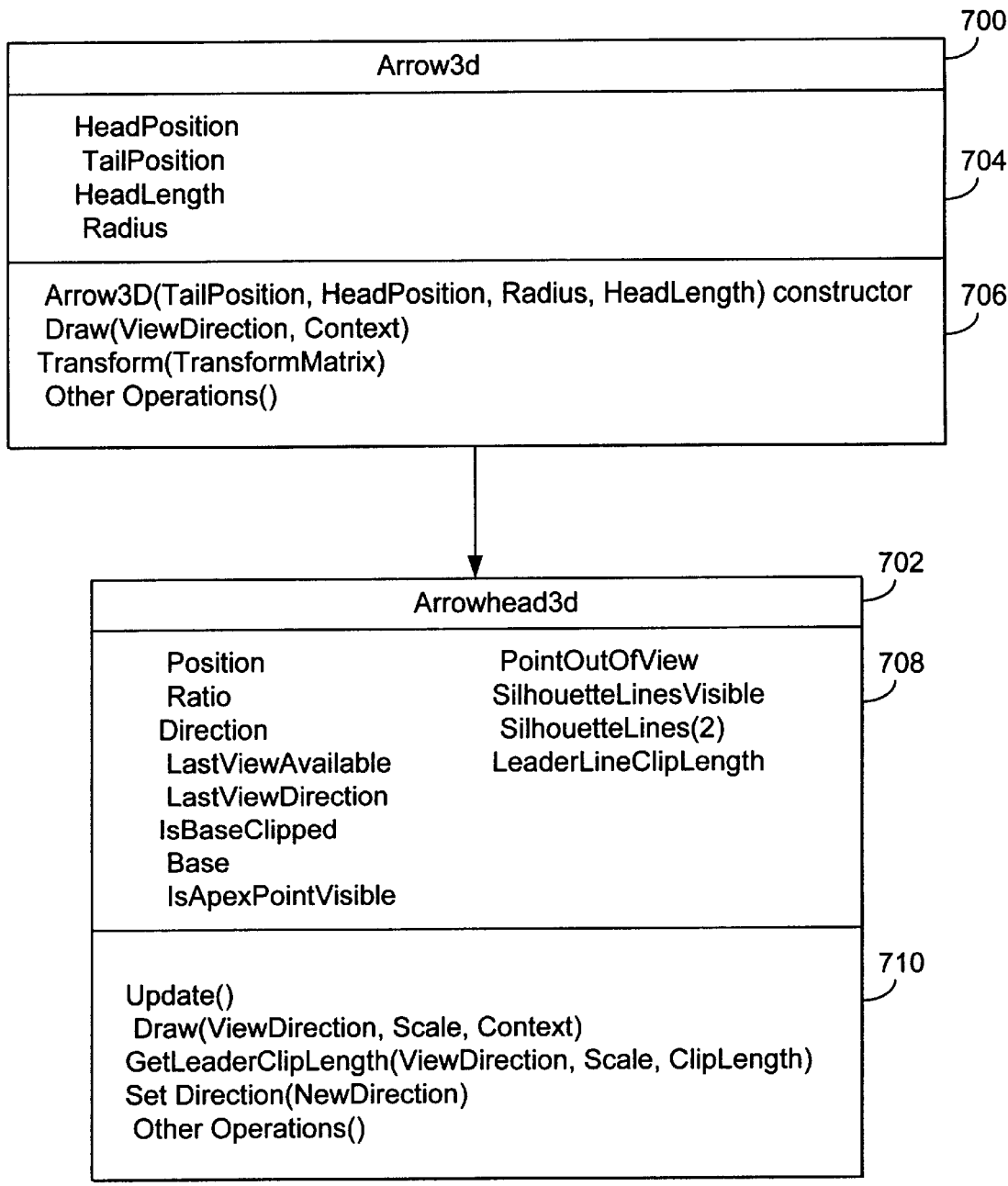
FIG. 7 is an object model illustrating the properties and actions of the arrow of the present invention.

FIG. 7 is an object model illustrating the properties and actions of the arrow 500 of the present invention. The object model is used within an object-oriented programming system, which is known in the art.

FIG. 7 illustrates that arrow 500 has two major components: arrow3d 700 and arrowhead3d 702. Arrow3d 700 contains several properties that are passed to arrow3d 700 from outside of arrow3d 700, and performs several actions that calculate properties for arrow3d 700.

Properties 704 of arrow3d 700 contains the head and tail position points of arrow 500, and the head length and radius of arrow 500. Actions 706 contains arrow3d, which constructs the arrow 500; draw, which displays the physical image of arrow 500 on monitor 110 given the view direction vector 312 as input; and transform, which transforms arrow 500 in three-dimensional space. Other operations can also be included in actions 706.

Arrowhead3d 702 contains properties 708 and actions 710. Properties 708 contains a position, ratio, and direction for the arrowhead 300. Other properties include a previous view direction vector, and whether the previous view direction vector is available; the base 302, which is typically a circle; a boolean flag to determine if a portion of the base is obscured or "clipped" because of the view angle; a boolean flag to determine if apex 504 is visible, and a boolean flag to determine if the arrowhead 300 points in a direction out of the monitor (out of the view) 110. Further, the properties include lines that represent the silhouette lines 314 and 316, a boolean flag to determine whether to display the silhouette lines 314 and 316, and a leader clip length to determine how much of the leader line 502 to display on the monitor 110.

The actions 710 of arrowhead3d 702 include a constructor arrowhead3d function, which constructs the arrowhead 300; an update function, which generates the geometry to be used by display and other functions for e.g., displaying the arrowhead, selecting the arrowhead, etc.; and a draw function, which draws the arrowhead 300 on monitor 110. Further, actions 710 include a function to get the leader line 502 clip length, set new directions for the arrowhead 300, and determine whether or not the leader line 502 is visible from the view angle. Other operations are also possible within actions 710.

Figure 8:
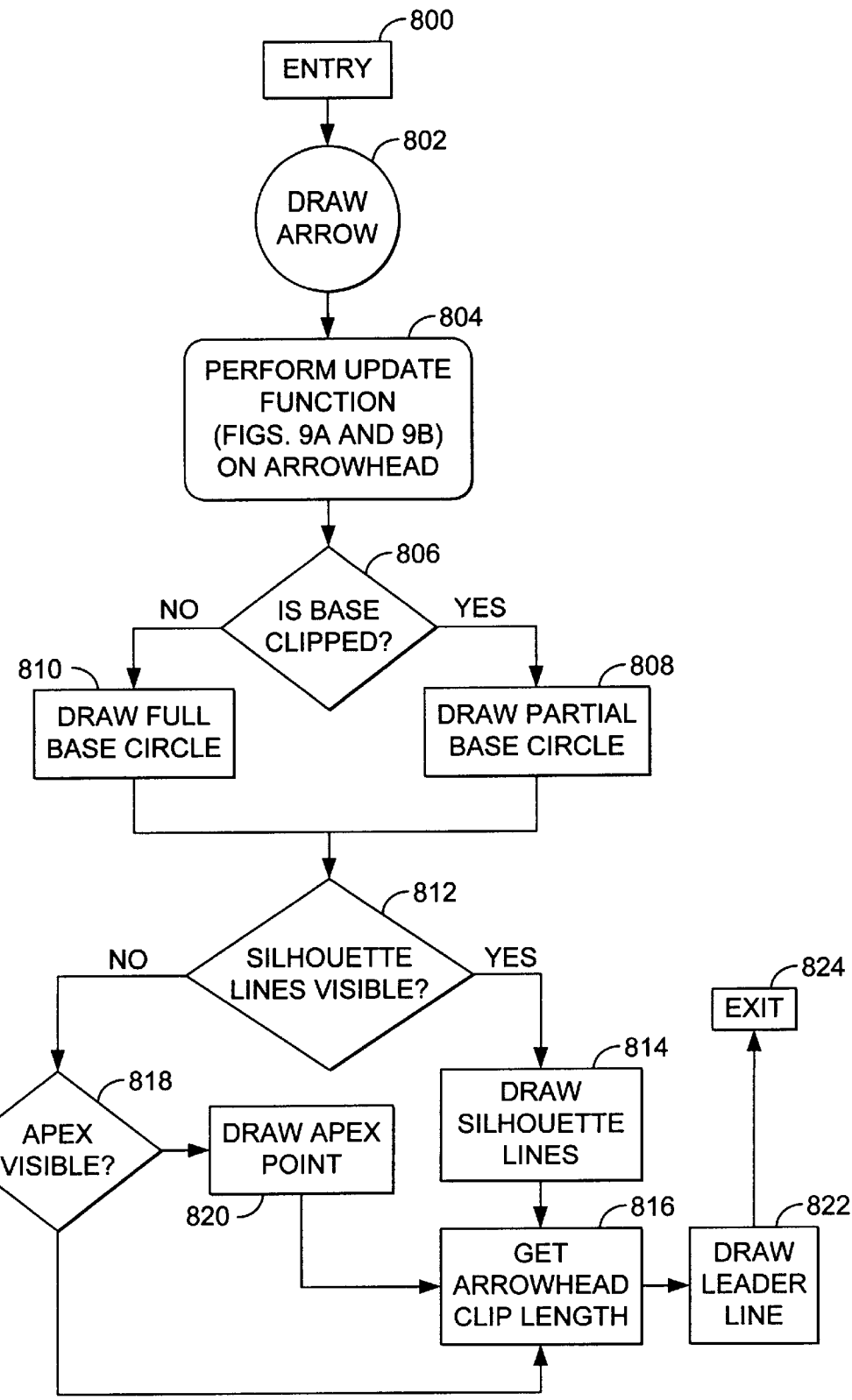
FIG. 8 illustrates the logic performed by the computer to draw the arrow of the present invention.

FIG. 8 illustrates the logic performed by the computer to draw the arrow of the present invention.

Block 800 illustrates the computer 100 entering the logic of arrow computing function 120. If input to the computer 100 is a command illustrated in block 802 to draw an arrow of the present invention, control passes to block 802 and then to block 804. Block 804 illustrates computer 100 performing the logic illustrated in FIGS. 9A and 9B. Any function that also needs the geometry of arrowhead 300 to be recalculated would also perform the logic illustrated in FIGS. 9A and 9B below. Control then passes to block 806, which is a decision block where computer 100 determines whether base 302 is clipped, as determined in blocks 924 and 930 of FIG. 9A. If base 302 is clipped, control transfers to block 808, where computer 100 draws a partial base 302 circle; if base 302 is not clipped, control passes to block 810, where computer 100 draws a full base circle. Control then transfers to block 812, where computer 100 determines whether silhouette lines 314 and 316 are visible, as determined in block 916 of FIG. 9A. If so, control passes to block 814, where silhouette lines 314 and 316 are drawn by the computer 100 on monitor 110, and then control passes to block 816. If not, control transfers to decision block 818, where computer 100 determines if apex 504 is visible, as done in blocks 922 and 932 of FIG. 9A. If apex 504 is visible, control transfers to block 820, where computer 100 draws apex point 504, and control then transfers to block 816. If apex point 504 is not visible, control transfers directly to block 816.

Figure 9A:
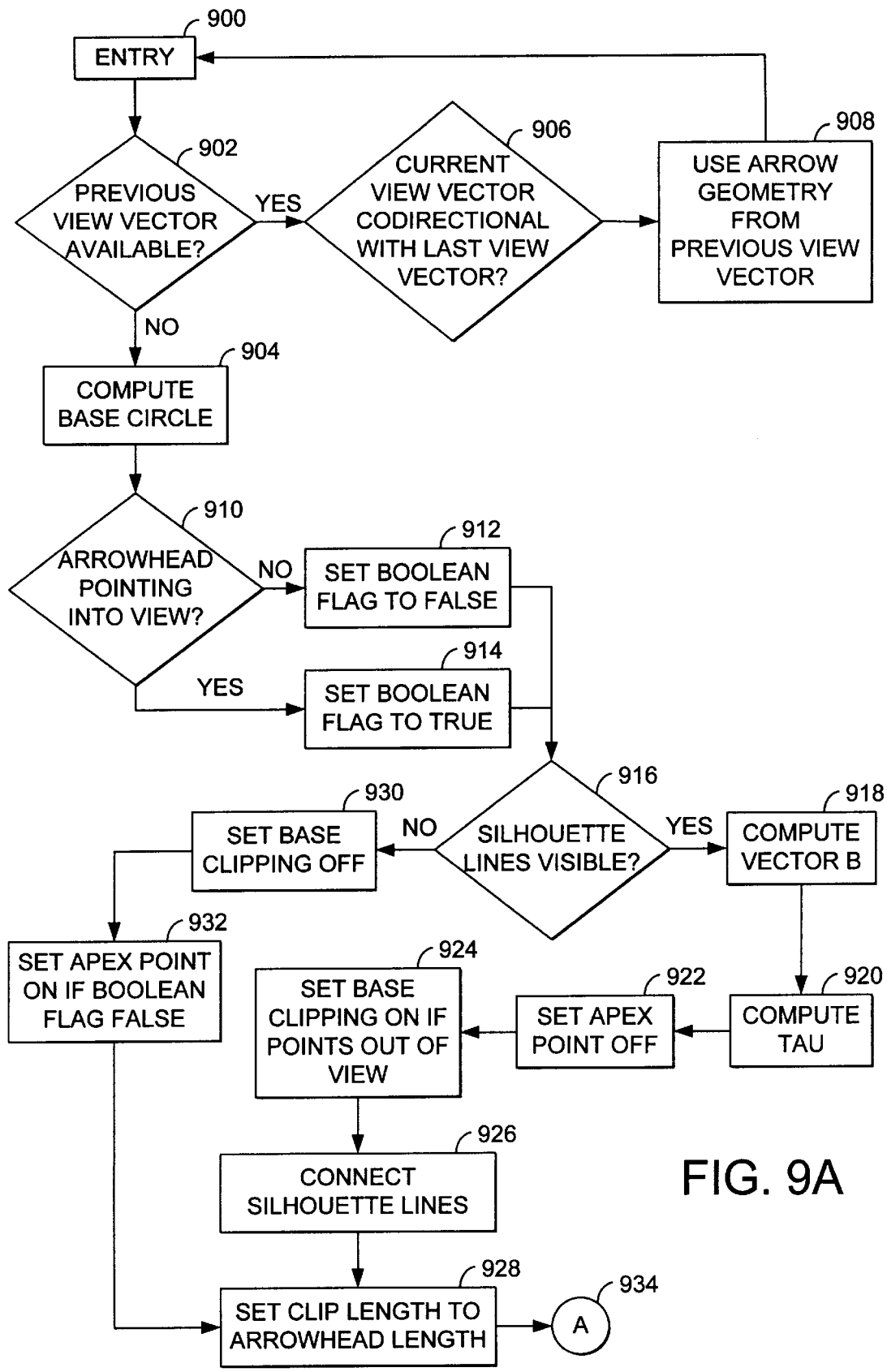
FIGS. 9A and 9B are flowcharts illustrating the steps of updating the geometry of the arrowhead of the present invention.
Figure 9B:
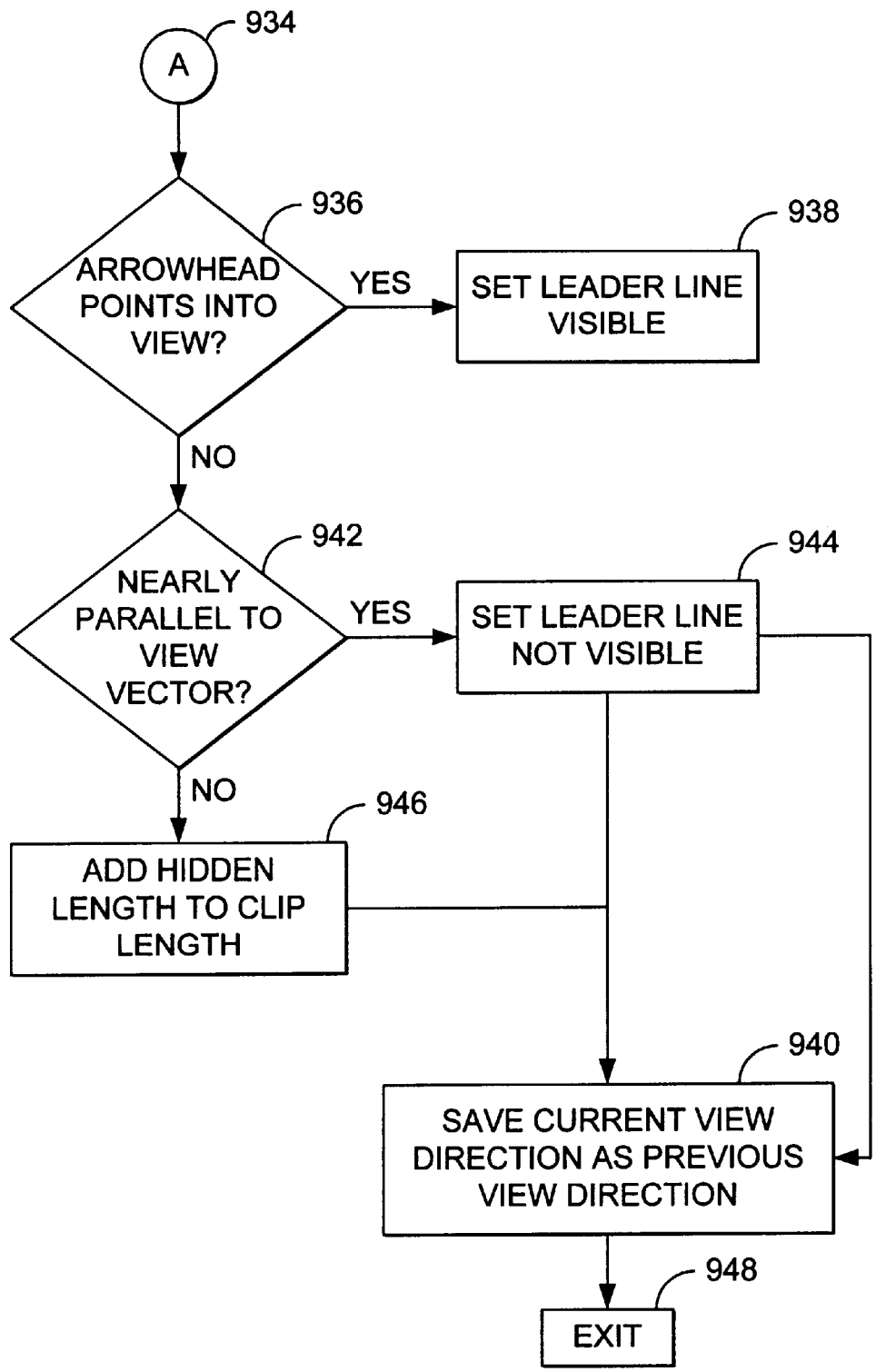

Block 816 represents the computer 100 retrieving the clip length for leader line 502, as determined in blocks 928 and 946 of FIGS. 9A and 9B. Control then passes to block 822, where leader line 502 is drawn by computer 100 if the leader line was set to visible in block 938 of FIG. 9B. Control then transfers to block 824, where computer 100 exits the logic of arrow computing function 120 and/or waits for further input.

FIGS. 9A and 9B are flowcharts illustrating the steps of updating the geometry of the arrowhead of the present invention.

Block 900 represents the computer 100 entering the logic of the flowchart from the program 118. If the event from the program 118 is to select or draw an arrowhead 300, the remainder of the flowchart of FIGS. 9 and 9B are employed by the computer 100 to perform the present invention, and control transfers to block 902.

Block 902 is a decision block where the computer 100 determines if a previous view direction vector 312 is available. If not, the computer 100 must recalculate the geometry of arrowhead 300, and control transfers to block 904. If so, control passes to block 906.

Block 906 is a decision block where the computer 100 determines if the current view direction vector 312 is codirectional with the last view vector. The term codirectional means, in this context, that the current view direction vector 312 is parallel and pointing in the same direction as the previous view direction vector 312. If the vectors are codirectional, control passes to block 908, where the arrowhead 300 is redrawn using the previous view direction vector 312, meaning that the shape of the arrowhead 300 has not changed. If not, the base 302 must be recomputed to draw arrowhead 300.

Block 904 represents the computer 100 computing the base 302 as described with respect to FIGS. 3–5. Control then passes to block 910, which is a decision block where the computer 100 determines whether the arrowhead 300 is pointing into or out of the monitor 110. If the arrowhead 300 is pointing out of the monitor 110, a boolean flag is set to record this condition in block 912; if the arrowhead 300 is pointing into the monitor 110, a boolean flag is set to this condition in block 914.

Control then passes to decision block 916, where the computer determines whether silhouette lines 314 and 316 are visible. If so, vector b 304 must be computed, as done by the computer 100 in block 918. Tau (τ) must then be computed by the computer 100 as described in FIGS. 4 and 6, as shown in block 920. Since silhouette lines 314 and 316 are visible, apex point 504 is not, and is turned to be not visible in block 922 by computer 100. As determined in blocks 910–914, if the arrowhead 300 is pointing out of the monitor 110, base 302 must be clipped to not show portion 406 on monitor 110, which is performed by the computer in block 924. Silhouette lines 314 and 316 are connected between base 302 and apex 504 by the computer 100 in block 926. Control then transfers to block 928.

If the silhouette lines were determined not to be visible in block 916, control transfers to block 930, where the computer sets the entire base 302 to be visible on the monitor 110. If the boolean flag was set to be false in block 912, then the apex point 504 is visible, and is set to be visible by computer 100 in block 932. Control then transfers to block 928.

Block 928 represents the computer 100 setting the clip length l to the length of arrowhead 300, because at least that much of leader line 502 will be obscured by arrowhead 300. Control then passes to point A 934.

Referring now to FIG. 9B, from point A 934 control then transfers to block 936, which is a decision block similar to block 910, where computer 110 checks the flags set in blocs 912 and 914. If the arrowhead 300 points into the monitor 110, control transfers to block 938, where computer 100 sets the leader line 502 to be visible on monitor 110. Control then transfers to block 940.

If not, control passes to block 942, where computer 100 determines whether the arrowhead 300 is nearly parallel to the view direction vector 312. If so, control transfers to block 944, where leader line 502 is set to not be visible on monitor 110. If not, control transfers to block 946, where the additional hidden length l as determined with respect to FIG. 5A is clipped from leader line 502. Control then transfers to block 940, where the current view direction vector 312 is saved by computer 100 as the previous direction vector 312 for use in decision block 902. Control then transfers to block 948, where computer 100 exits the logic of the flowchart.

Conclusion

This concludes the description of the preferred embodiment of the invention. In summary, the present invention discloses a method, apparatus and article of manufacture for generating an arrow with a computer wherein the shape of the arrow approximates a direction that the arrowhead is pointing. The computer creates a base and is given an axis vector for the arrowhead, where the axis vector is substantially normal to the base and points from the center of the base to the apex of the arrowhead.

The computer then determines the angle between the axis vector and the view direction vector, where the view direction vector is substantially normal to a three-dimensional frame of reference displayed on the display of the computer. The arrowhead is then displayed on the display device of the computer wherein the arrowhead is rotated by the angle between the view direction vector and the axis vector.

The following describe some alternative ways of accomplishing the present invention. For example, different computer programs, operating environments, and operating systems can be substituted for those described herein. In addition, the present invention can use any type of computer, and need not be limited to a personal computer. The present invention can also use any type of graphics system, and need not be limited to the example described herein. Further, alternate approaches could be substituted for the logic described herein without departing from the scope of the present invention.

Tabular lookup for rendering the arrowheads 300 of the present invention can also be used. Angular relationships between the view direction vector 312, axis vector 306, and base vector 304 can be stored in a table, and renderings of an arrowhead 300 can be taken from the table or database as required. Other methods for expediting the calculations required to generate the arrowheads 300 are also possible with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for generating an arrow for display on a computer wherein the shape of the arrow approximates a direction that the arrow is pointing, comprising the steps of:

(a) computing a base for the arrowhead using an axis vector for the arrowhead, the axis vector being substantially normal to the base of the arrowhead and pointing from a center of the base to an apex of the arrowhead;

(b) determining an angle between a view direction vector and the axis vector, the view direction vector being substantially normal to a three-dimensional frame of reference displayed on the computer; and (c) displaying the arrowhead on the computer wherein the arrowhead is rotated by the angle between the view direction vector and the axis vector.

2. The method of claim 1, wherein the base of the arrowhead is a circle.

3. The method of claim 2, further comprising the step of determining a parameter τ of the base circle.

4. The method of claim 2, further comprising the steps of:

connecting a first silhouette line from a first connection point on the base to the axis vector at the apex of the arrowhead; and connecting a second silhouette line to a second connection point on the base to the axis vector at the apex of the arrowhead.

5. The method of claim 4, further comprising the steps of:

determining an intersection of a base vector in a plane of the base and the base;

determining an angle τ, measured from the intersection of the base vector and the base;

determining an angle of two π minus τ, measured from the intersection of the base vector and the base;

connecting the first silhouette line from the apex of the arrowhead to the first connection point at the angle τ; and connecting the second silhouette line from the apex of the arrowhead to the second connection point at the angle two π minus τ.

6. The method of claim 5, wherein the angle τ is determined by:

$$\tau = \arccos s/d$$

where s is a height of a projection of a line from the center of the base to the intersection of the base vector and the base onto a plane normal to the view direction vector, and d is a height of a projection of the center of the base to the apex of the arrowhead onto a plane normal to the view direction vector.

7. The method of claim 5, wherein the first and second silhouette lines are selectively displayed on the computer.

8. The method of claim 7, wherein the first and second silhouette lines are displayed when s<d.

9. The method of claim 1, further comprising the step of connecting a leader line to the center of the base of the arrowhead to produce an arrow.

10. The method of claim 9, wherein the leader line is substantially parallel to the axis vector.

11. An apparatus for generating an arrowhead for display on a computer wherein the shape of the arrowhead approximates a direction that the arrowhead is pointing, the apparatus comprising:
   (a) a computer;
   (b) means, performed by the computer, for computing a base for the arrowhead;
   (c) means, performed by the computer, for determining an axis vector for the arrowhead, the axis vector being substantially normal to the base and pointing from a center of the base to an apex of the arrowhead;
   (d) means, performed by the computer, for determining an angle between a view direction vector and the axis vector, the view direction vector being substantially normal to a three-dimensional frame of reference displayed on the computer; and
   (e) means, performed by the computer, for displaying the arrowhead on the computer wherein the arrowhead is rotated by the angle between the view direction vector and the axis vector.

12. A program storage device, readable by a computer, tangibly embodying one or more programs of instructions executable by the computer to perform method steps of generating an arrowhead with a computer wherein the shape of the arrowhead approximates a direction that the arrowhead is pointing, comprising the steps of:
   (a) computing a base for the arrowhead;
   (b) determining an axis vector for the arrowhead, the axis vector being substantially normal to the base and pointing from a center of the base to an apex of the arrowhead;
   (c) determining an angle between a view direction vector and the axis vector, the view direction vector being substantially normal to a three-dimensional frame of reference displayed on the computer; and
   (d) displaying the arrowhead on the computer wherein the arrowhead is rotated by the angle between the view direction vector and the axis vector.

* * * * *